United States Patent [19]
Rathert

[11] Patent Number: 5,409,341
[45] Date of Patent: Apr. 25, 1995

[54] BOOK COVER ASSEMBLY APPARATUS

[75] Inventor: Horst Rathert, Minden, Germany

[73] Assignee: Kolbus GmbH & Co., KG, Rahden, Germany

[21] Appl. No.: 162,437

[22] Filed: Dec. 3, 1993

[30] Foreign Application Priority Data

Dec. 9, 1992 [DE] Germany .............. 42 41 387.7
Mar. 17, 1993 [DE] Germany .............. 43 08 470.2

[51] Int. Cl.6 .............................................. B42C 7/00
[52] U.S. Cl. ...................................... 412/17; 156/556; 156/583.3
[58] Field of Search ............... 412/3, 17, 19, 22; 156/286, 391, 556, 559, 560, 562, 583.3

[56] References Cited

U.S. PATENT DOCUMENTS

| | | |
|---|---|---|
| 1,794,521 | 3/1931 | Kirchhofer . |
| 3,204,986 | 9/1965 | Tooker ..................... 412/3 X |
| 3,964,953 | 6/1976 | Mitchard et al. .............. 156/300 |
| 4,624,719 | 11/1986 | Volbel et al. ................ 156/556 X |
| 4,640,734 | 2/1987 | Roberts et al. ................ 156/562 |
| 5,092,954 | 3/1992 | Braun et al. ................. 156/540 |
| 5,127,786 | 7/1992 | Cross ......................... 412/3 |

Primary Examiner—Tom Hughes
Attorney, Agent, or Firm—Chilton, Alix & Van Kirk

[57] ABSTRACT

A book cover assembly apparatus includes a cover table and a transport arm. The transport arm has a vertically moveable suction head which carries cover boards to the cover table which is initially in an inclined acquiring position. The transport arm establishes an initial line of contact between an adhesively coated cover cloth disposed on the cover table and the cover boards. The cover table is pivoted to a horizontal position in synchronization with movement of the transport arm thereby progressively diminishing the angle included by the cover cloth and cover boards. Such combined movement causes the contact line to move across the cover cloth, rolling the cover cloth into contact with the cover boards.

12 Claims, 2 Drawing Sheets

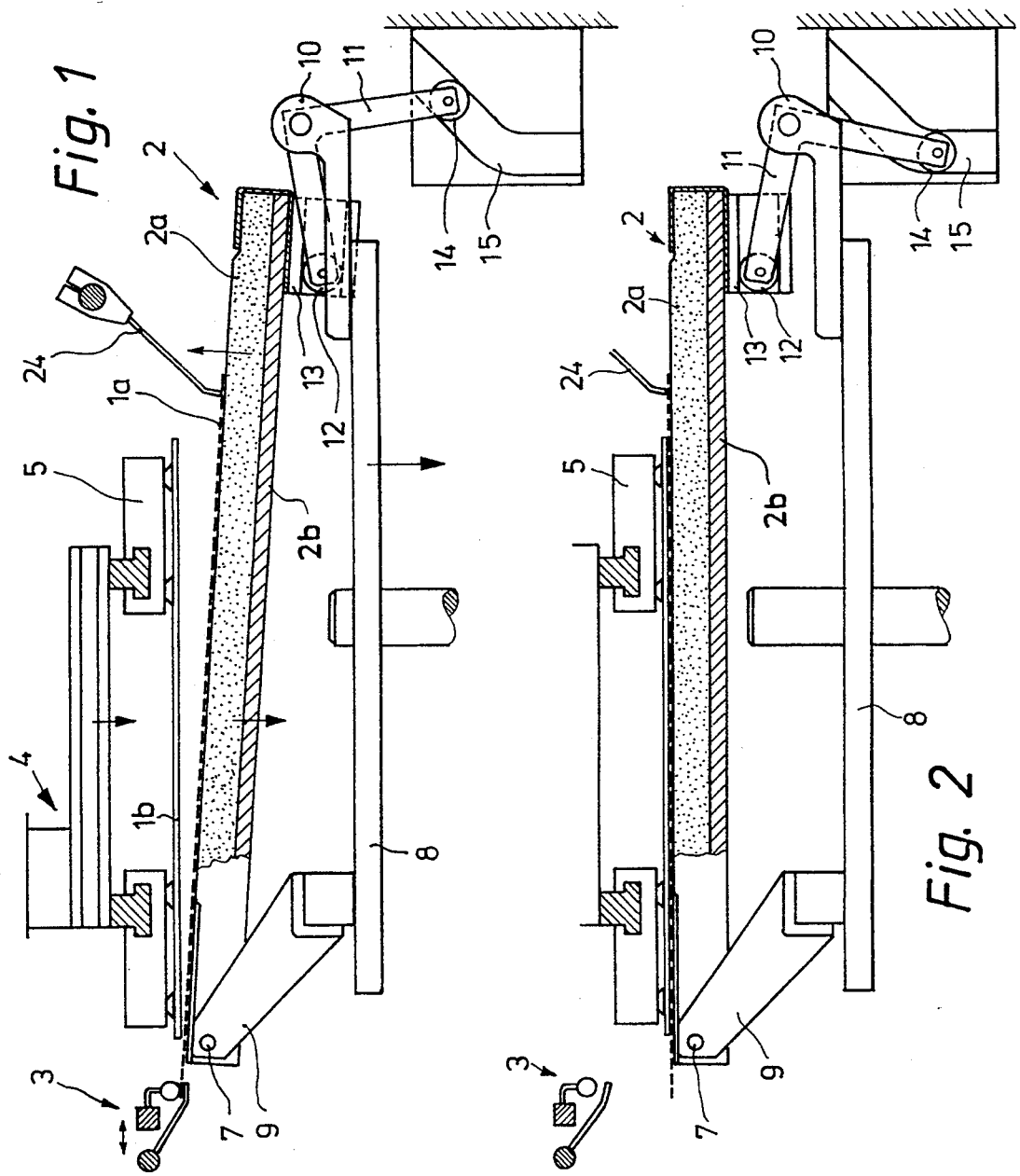

BOOK COVER ASSEMBLY APPARATUS

BACKGROUND OF THE INVENTION

The present invention relates generally to the manufacture of book covers and particularly to the controlled and gradual establishment of contact between the adhesively coated cover cloth and cover boards during assembly of a book cover. More specifically, this invention relates to improved methods of and apparatus for fabricating book covers.

Book covers consist of a covering material, front and back cover boards and a spine board positioned between the two cover boards. The boards are glued to the covering material over their entire area. The covering material that projects beyond the cover profile defined by the boards is turned in on all four sides to define flaps. In the industrial manufacture of book covers, these manufacturing operations are accomplished by book cover assembly apparatus.

In a known cover fabrication apparatus, the cut-to-size covering material, or cover cloth, is separated from a magazine and fed to a glue roller via a cloth cylinder. A gripper bar acquires the glue-coated cloth and deposits it on a cover table. Feeder elements push the cut-to-size front and back cover boards from magazines to a ready-use supply station simultaneously with the infeeding of a spine board that has been cut to length from a reel.

Two cover boards and a spine board are simultaneously picked up at the supply station by a suction head mounted on an arm. The arm is rotated through 180° to bring the boards into registration with a glue-coated cloth which is lying on the cover table. Due to the materials being brought into contact while substantially parallely oriented, i.e., the board and cloth are pressed flat against one another, attempts to increase production rate result in air being entrapped between the cloth and boards. Such entrapped air, in turn, results in blisters which give the book cover an unsightly appearance and, if they are comparatively large, will result in the cover being rejected by quality control.

SUMMARY OF THE INVENTION

The present invention overcomes the above-briefly discussed and other deficiencies and disadvantages of the prior art by providing a novel and improved method of fabricating book covers and a book cover assembly apparatus for use in the practice of such method.

A book cover assembly apparatus in accordance with one embodiment of the present invention comprises a novel cover table and a cover transport arm which cooperates therewith. The transport arm is both rotatable about an axis, typically a vertical axis, and moveable along the axis. A first side of the cover table, corresponding to the foot of the cover, is pivotally mounted thus enabling the table to rotate between an upper "acquiring" position and a lower position. The transport arm acquires cover boards and transports the boards to the cover table. The table is inclined with respect to the plane defined by the incoming cover boards when in the board receiving position. Accordingly, the cover boards initially contact the cover cloth along a line at the head edge of the cover. The cover table is then rotated about its foot end in synchronization with descending movement of the cover transport arm. As this combined movement occurs, the line of contact between the boards and cloth moves from the head side of the cover to the foot side and the cover cloth is thus rolled into contact with the cover boards.

The rolling of the cover cloth into contact with the cover boards provides two principal benefits. Firstly, it is possible to fit the boards to the cloth in a manner assuring precise registration. Secondly, the rolling motion avoids entrapment of air, preventing the formation of blisters.

BRIEF DESCRIPTION OF THE DRAWING

The present invention may be better understood and its numerous objects and advantages will become apparent to those skilled in the art by reference to the accompanying drawings wherein like reference numerals refer to like elements in the several figures and in which:

FIG. 1 is a schematic side elevation view of a cover table, in the acquiring position, in accordance with a first embodiment of the invention;

FIG. 2 is a schematic side view of the cover table of FIG. 1 in the lower position;

DESCRIPTION OF THE DISCLOSED EMBODIMENTS

Figure 3:
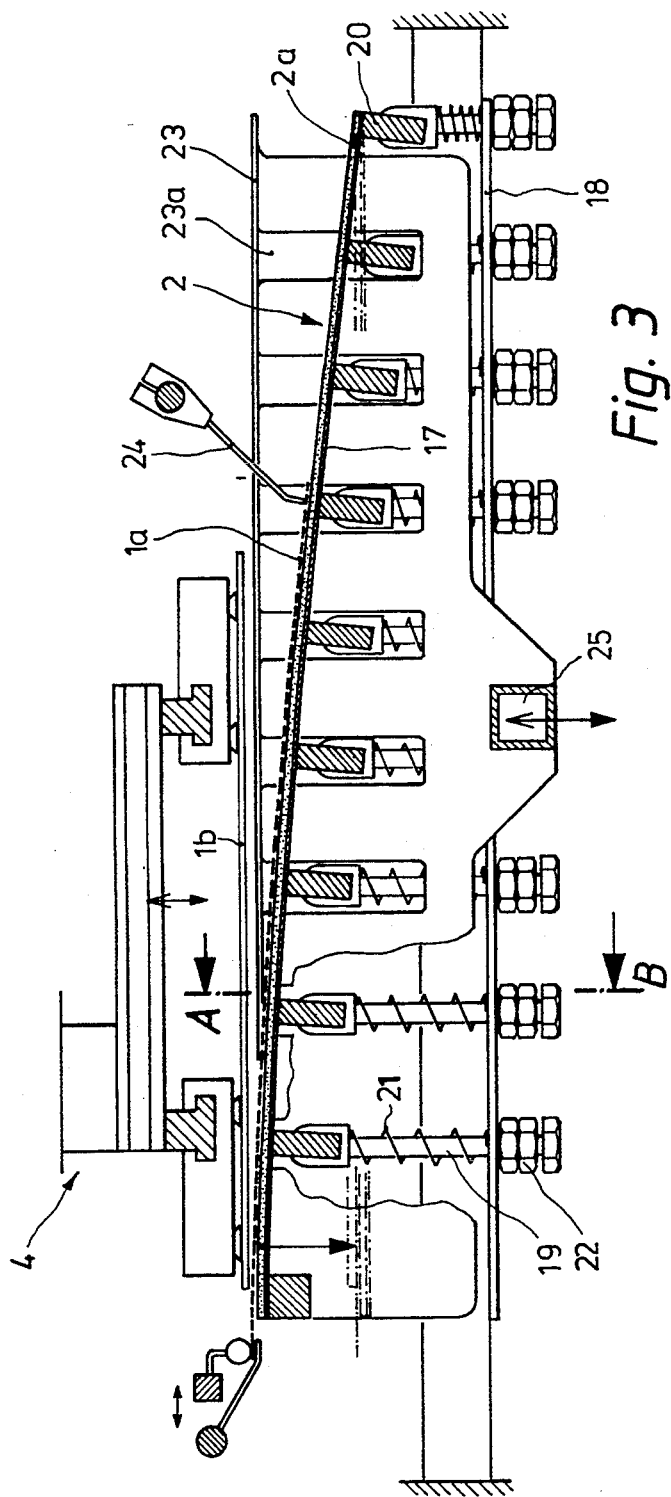
FIG. 3 is a schematic side elevation view of a cover table, in the acquiring position, in accordance with a second embodiment of the invention.

With reference to FIGS. 1 and 2, the apparatus shown is intended for use in assembling book covers comprised of a covering material or cloth 1a which is glued to cover boards 1b consisting of two side pieces and a spine strip. The cover cloth has head, foot and lateral turn-in flap portions that are folded over head, foot and lateral edges of the cover, as defined by the three boards, during the assembly process.

The cover cloth 1a is withdrawn from a feeder-station magazine (not shown) in a known manner and acquired by a cloth cylinder with grippers (not shown). After all-over application of glue to a first side thereof, the glue-coated cloth is engaged, while at a standstill, by a gripper bar 3. Gripper bar 3 is reciprocal along a straight line path. The cloth 1a, is deposited on a cover table 2 by gripper bar 3. Cover table 2 is provided with a facing layer 2a comprised of a resilient material. Table 2 can be swung between an upper, acquiring position, where the plane defined by its upper surface is inclined relative to the plane of the incoming cover boards, and a lower position where the table surface and boards are substantially parallel. Immediately before the gripper bar 3 completes the forward transport of the cloth 1a onto the cover table 2, hold-down fingers 24 engage and press cloth 1a against the cover table 2 in the area of the foot turn-in flap. The action of fingers 24 results in the cloth 1a being kept taut.

A transport arm 4 is situated between the cover table 2 and a supply station (not shown) for the cover boards 1b. The transport arm 4 can be rotated about a vertical axis and be moved along the axis. Transport arm 4 carries suction heads 5 which pick up the boards 1b which have been supplied ready for use and transports the boards in a horizontal planar orientation. By imparting vertical and rotational movement to arm 4, the cover boards can be transferred from their supply station to cover table 2 which, as depicted in FIG. 1, will be inclined with respect to the boards when in the acquiring position.

After the rotary movement of arm 4 has been completed, the boards 1b, held by the suction head 5, are caused to descend and are thus brought into contact with the cloth 1a. Contact between the cloth and boards is established initially only at the side corresponding to the head turn-in flap. As a result of the cover table 2 subsequently being rotated in the counter-clockwise direction to the lower position in synchronism with the further descending movement of the transport arm 4, the angle included by the boards 1b and the cloth 1a progressively diminishes. Accordingly, the area of contact between the cloth and boards progressively increases from the head to the foot side of the cover. In consequence of the progressive advancing across the cover of the line where contact between the cloth and boards begins, the cloth 1a is effectively rolled into contact with the boards 1b.

In a preferred embodiment, the cover table 2 comprises a planar plate 2b. The cover table 2 can, as noted above, be rotated between the upper inclined position of FIG. 1 and the lower position of FIG. 2. This rotational or pivotal movement is permitted by attachment of plate 2b to a horizontal axle 7. Axle 7 is supported in projecting arms 9 which are mounted on an intermediate supporting member 8. At the opposite side of the cover table with respect to axle 7, a controlled lifting movement is executed through the agency of an angle lever 11 which is mounted in a bearing block 10. Bearing block 10 is attached to the intermediate supporting member 8. The angle lever 11 is guided at a first end by means of a control roller 12 which engages a slot in a link member 13 affixed to cover table 2. The other end of lever 11 supports a second control roller 14. Roller 14 is engaged in a cam track 15 mounted on the machine frame. As a result of the intermediate supporting member 8 being lowered through the agency of drive means, not shown in the drawing, the cover table 2 is forcibly constrained to execute its pivotal movement, controlled through the agency of the angle lever 11 which is guided at its opposite ends in the track 15 and slot-link 13 respectively by means of its control rollers 12 and 14.

Figure 4:
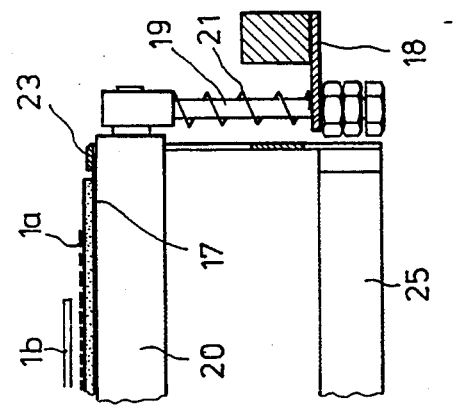
FIG. 4 is a partial cross-section view, taken along line A-B in FIG. 3, of the cover table of FIG. 3.

In an alternative embodiment, as illustrated in FIGS. 3 and 4, the table 2 is defined by a flexible table "plate" 17 which, in its upper position where it is inclined with respect to the incoming cover boards 1b, is bent to a convex shape. Plate 17, in the manner to be described below, can be reconfigured and repositioned so as to be parallel with cover boards 1b.

Plate 17 is carried by an intermediate supporting member 18. A multiplicity of tie bolts 19 pass through member 18 and act on the opposite ends of transversely oriented supporting rails 20 which are affixed to the underside of plate 17. The coupling between bolts 19 and rails 20 is best seen from FIG. 4. Compression springs 21 are mounted on tie bolts 19. Threaded adjusting means, i.e., nuts 22, are provided on bolts 19 at the underside of member 18 in order to enable the convex curvature of the table plate 17 to be set by individually preloading the compression springs 21.

Angularly shaped pulling rails 23 engage plate 17 on opposite sides. Pulling rails 23 can be moved, through the agency of operating means not shown in the drawing, from an upper position to a lower position. During this movement the rails retain their horizontal orientation and translate plate 17 from the upper or acquiring position, where the table is bent to a convex shape, into the horizontal or lower movement-limit position. As this movement occurs, the angle included by the cover boards 1b and the cover covering 1a progressively diminishes. The oppositely disposed pulling rails 23 are interconnected by a common cross-member 25 and have cutouts 23a through which the supporting rails 20 of plate 17 extend. The operating means for the table acts on the cross-member 25.

As in the embodiment of FIGS. 1 and 2, the embodiment of FIGS. 3 and 4 employs hold-down fingers 24 to stretch the cloth 1a taut.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a book cover fabrication apparatus for assembling cover boards and a cover cloth, the apparatus having feeder stations for cover cloths and planar cover boards, a glue application station, a turn-in station and a roll pressing station, the cover cloth having head, foot and lateral turn-in flap defining portions, the improvement comprising:

cover board transport means, said transport means including a rotatable and axially moveable transport arm, said transport means further including carrier means mounted on said arm for acquiring and carrying the cover boards;

a cover table, said cover table having an upper surface for receiving an adhesively coated cover cloth, said cover table being moveable between a first position and a second position, said cover table upper surface being inclined at an angle with respect to the plane defined by incoming cover boards when said table is in said first position whereby a line of contact may be established between said cloth and said boards, said cover table upper surface being substantially parallel to the plane defined by said cover boards carried by said transport means when said table is in said second position; and means for causing said cover table to move between said table first and second positions whereby the angle between said cover boards and said cover table is progressively diminished as said cover table moves from said first position to said second position.

2. The apparatus of claim 1 wherein said cover table is moved from said first position to said second position in synchronism with axial movement of said transport means.

3. The apparatus of claim 2 wherein said means for causing said cover table to move comprises an axle, an intermediate supporting member having opposite first and second sides, a projecting member having opposite first and second ends, and control means, said cover table having opposite first and opposite second sides, said cover table first side being pivotally mounted to said projecting member first end by said axle, said projecting member second end being mounted to said intermediate support member first side, said cover table second side being pivotally moveable from said first position to said second position by said control means.

4. The apparatus of claim 3 wherein said control means comprises an angle lever having first and second ends, a bearing block, first and second control rollers, a slot link, and a bent track, said bearing block being mounted on said intermediate supporting member second side, said angle lever being pivotally mounted on said bearing block at a point intermediate said angle lever first and second ends, said slot link being mounted to said cover table second side, said first control roller being mounted on said angle lever first end and disposed in said slot link, said second control roller being mounted on said angle lever second end and disposed in said bent track.

5. The apparatus of claim 4 wherein said cover table further comprises a resilient material mounted on said upper surface.

6. The apparatus of claim 5 further comprising hold-down fingers for pressing the cover cloth against said cover table at least in a first of said flap defining portions.

7. The apparatus of claim 1 wherein said cover table comprises a flexible table plate, said flexible table plate being bent to a convex shape when said cover table is in said first position, said flexible plate being reshaped to be parallel to the cover boards when said cover table is in said second position.

8. The apparatus of claim 7 wherein said means for causing said cover table to move comprises an intermediate support member having a plurality of throughbores, a plurality of tie bolts each having first and second ends, a plurality of compression springs, first and second pulling rails, and adjusting means mounted on said bolts, said flexible plate having opposite first and second longitudinal sides and a lower surface, said pulling rails engaging with said flexible plate first and second sides, said tie bolt first ends being coupled to said flexible plate lower surface, said compression springs being disposed around said tie bolts, said tie bolt second ends extending through said intermediate support member throughbores and being engaged by said adjusting means whereby said flexible plate may be caused to assume said convex shape by selectively compressing said springs, said pulling rails pulling said flexible plate from said first position to said second position against all of said compression springs.

9. The apparatus of claim 8 further comprising hold-down fingers for pressing the cover cloth against said cover table at least in a first of said flap defining portions.

10. The apparatus of claim 7 further comprising hold-down fingers for pressing the cover cloth against said cover table at least in a first of said flap defining portions.

11. The apparatus of claim 1 wherein said cover table further comprises a resilient material mounted on said upper surface.

12. The apparatus of claim 1 further comprising hold-down fingers for pressing the cover cloth against said cover table at least in a first of said flap defining portions.

* * * * *